US009123341B2

(12) United States Patent
Weng et al.

(10) Patent No.: US 9,123,341 B2
(45) Date of Patent: Sep. 1, 2015

(54) SYSTEM AND METHOD FOR MULTI-MODAL INPUT SYNCHRONIZATION AND DISAMBIGUATION

(75) Inventors: Fuliang Weng, Mountain View, CA (US); Liu Ren, Sunnyvale, CA (US); Zhe Feng, Shanghai (CN); Lincan Zou, Shanghai (CN); Baoshi Yan, Mountain View, CA (US); Zhongnan Shen, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 1683 days.

(21) Appl. No.: 12/406,661

(22) Filed: Mar. 18, 2009

(65) Prior Publication Data
US 2010/0241431 A1    Sep. 23, 2010

(51) Int. Cl.
*G10L 15/00* (2013.01)
*G10L 15/26* (2006.01)
*G10L 21/00* (2013.01)
*G10L 15/24* (2013.01)
(Continued)

(52) U.S. Cl.
CPC ............... *G10L 15/24* (2013.01); *G06F 3/038* (2013.01); *G06F 3/16* (2013.01); *G06F 2203/0381* (2013.01); *G10L 15/00* (2013.01); *G10L 21/06* (2013.01)

(58) Field of Classification Search
CPC ..... G10L 15/00; G10L 15/08; G10L 15/1815; G10L 15/18; G10L 15/26; G10L 15/165; G10L 15/22; G10L 15/24; G10L 15/25; G10L 21/06; G10L 2015/00; G10L 2015/22; G10L 2015/225; G10L 2015/228; G10L 17/10; G06F 3/16; G06F 3/167; G06F 2203/0381

USPC ................ 704/231, 235, 270, 270.1, 275
See application file for complete search history.

(56) References Cited

U.S. PATENT DOCUMENTS 5,884,249 A * 3/1999 Namba et al. ................. 704/9
6,868,383 B1    3/2005 Bangalore et al.
(Continued)

FOREIGN PATENT DOCUMENTS

| EP | 1752911 A2 | 2/2007 |
| WO | 02/063599 A1 | 8/2002 |
| WO | 2005116803 A2 | 12/2005 |

OTHER PUBLICATIONS

Wachsmuth, I. 1999. "Communicative Rhythm in Gesture and Speech." In A. Braffort, R. Gherbi, S. Gibet, J. Richardson and D. Teil, eds. Gesture-Based Communication in Human-Computer Interaction. Heidelberg: Springer-Verlag, pp. 277-290.*

(Continued)

*Primary Examiner* — Paras D Shah
(74) *Attorney, Agent, or Firm* — Dergosits & Noah LLP

(57) ABSTRACT

Embodiments of a dialog system that utilizes a multi-modal input interface for recognizing user input in human-machine interaction (HMI) systems are described. Embodiments include a component that receives user input from a plurality of different user input mechanisms (multi-modal input) and performs certain synchronization and disambiguation processes. The multi-modal input components synchronizes and integrates the information obtained from different modalities, disambiguates the input, and recovers from any errors that might be produced with respect to any of the user inputs. Such a system effectively addresses any ambiguity associated with the user input and corrects for errors in the human-machine interaction.

17 Claims, 5 Drawing Sheets

(51) Int. Cl.
*G06F 3/038* (2013.01)
*G10L 21/06* (2013.01)
*G06F 3/16* (2006.01)

(56) References Cited

U.S. PATENT DOCUMENTS

| | | | |
|---|---|---|---|
| 6,964,023 B2* | 11/2005 | Maes et al. | 715/811 |
| 6,975,983 B1* | 12/2005 | Fortescue et al. | 704/9 |
| 7,069,215 B1 | 6/2006 | Bangalore et al. | |
| 7,152,033 B2* | 12/2006 | Gupta et al. | 704/270 |
| 7,533,014 B2* | 5/2009 | Mao | 704/9 |
| 7,630,901 B2* | 12/2009 | Omi | 704/275 |
| 7,742,641 B2* | 6/2010 | Ivanov et al. | 382/224 |
| 7,796,818 B2* | 9/2010 | Iwayama et al. | 382/187 |
| 7,848,917 B2* | 12/2010 | Soong et al. | 704/9 |
| 7,881,936 B2* | 2/2011 | Longe et al. | 704/257 |
| 7,949,528 B2* | 5/2011 | Parthasarathy | 704/257 |
| 2003/0046087 A1* | 3/2003 | Johnston et al. | 704/275 |
| 2003/0055644 A1 | 3/2003 | Johnston et al. | |
| 2003/0093419 A1* | 5/2003 | Bangalore et al. | 707/3 |
| 2004/0025115 A1* | 2/2004 | Sienel et al. | 715/513 |
| 2004/0093215 A1* | 5/2004 | Gupta et al. | 704/270 |
| 2004/0122674 A1* | 6/2004 | Bangalore et al. | 704/276 |
| 2005/0197843 A1* | 9/2005 | Faisman et al. | 704/276 |
| 2005/0278467 A1* | 12/2005 | Gupta et al. | 710/65 |
| 2005/0288934 A1 | 12/2005 | Omi | |
| 2006/0100871 A1* | 5/2006 | Choi et al. | 704/254 |
| 2006/0143216 A1* | 6/2006 | Gupta et al. | 707/102 |
| 2006/0143576 A1* | 6/2006 | Gupta et al. | 715/809 |
| 2006/0149550 A1* | 7/2006 | Salminen | 704/270.1 |
| 2008/0133228 A1* | 6/2008 | Rao | 704/231 |
| 2008/0228496 A1* | 9/2008 | Yu et al. | 704/275 |
| 2009/0049388 A1* | 2/2009 | Taib et al. | 715/738 |
| 2009/0064155 A1* | 3/2009 | Giuli et al. | 718/103 |
| 2009/0228273 A1* | 9/2009 | Wang et al. | 704/235 |
| 2010/0299144 A1* | 11/2010 | Barzelay et al. | 704/233 |

OTHER PUBLICATIONS

International PCT Search Report and Written Opinion, dated Jun. 1, 2010.

Michael Johnston et al., "Unification-based Multimodal Integration", Annual Meeting of the Association for Computational Linguistics Proceedings of the Conference, Arlington, VA, Jul. 1, 1997, pp. 1-8.

Philip R. Cohen et al., "QuickSet: Multimodal Interaction for Distributed Applications", Proceedings ACM Multimedia 97. Seattle, WA, Nov. 9-13, 1997. [Proceedings ACM Multimedia], Reading, Addison Wesley, U.S., vol., Conf. 5, Nov. 9, 1997, pp. 31-40.

Michael Johnston et al., "Multimodal Language Processing for Mobile Information Access" ICSLP 2002: 7th International Conference on Spoken Language Processing, Denver, Co, Sep. 16-20, 2002. [International Conference on Spoken Language Processing. (ICSLP] Adelaide: Casual Productions, AU, Sep. 16, 2002, pp. 2237-2240.

* cited by examiner

SYSTEM AND METHOD FOR MULTI-MODAL INPUT SYNCHRONIZATION AND DISAMBIGUATION

FIELD

Embodiments of the invention relate generally to dialog systems, and more specifically to synchronizing and disambiguating user input provided to a dialog system.

BACKGROUND

Spoken language is the most natural and convenient communication tool for people. Advances in speech recognition technology have allowed an increased use of spoken language interfaces with a variety of different machines and computer systems. Interfaces to various systems and services through voice commands offer people convenience and efficiency, but only if the spoken language interface is reliable. This is especially important for applications in eye-busy and hand-busy situations, such as driving a car or performing sophisticated computing tasks. Human machine interfaces that utilize spoken commands and voice recognition are generally based on dialog systems. A dialog system is a computer system that is designed to converse with a human using a coherent structure and text, speech, graphics, or other modalities of communication on both the input and output channel. Dialog systems that employ speech are referred to as spoken dialog systems and generally represent the most natural type of human machine interface. With the ever-greater reliance on electronic devices, spoken dialog systems are increasingly being implemented in many different systems.

In many human-machine interaction (HMI) systems, users can interact with the system through multiple input devices or types of devices, such as through voice input, gesture control, and traditional keyboard/mouse/pen inputs. This provides user flexibility with regard to data input and allows users to provide information to the system more efficiently and in accordance with their own preferences.

Present HMI systems typically limit particular modalities of input to certain types of data, or allow the user to only use one of multiple modalities at one time. For example, a vehicle navigation system may include both a voice recognition system for spoken commands and a touch screen. However, the touch screen is usually limited to allowing the user to select certain menu items by contact, rather than through voice commands. Such multi-modal systems do not coordinate user commands through the different input modalities, nor do they utilize input data for one modality to inform and/or modify data for another modality. Thus, present multi-modal systems do not adequately provide a seamless user interface system in which data from all possible input modalities can be used to provide accurate information to the system.

What is desired, therefore, is a multi-modal information user input interface for HMI systems that can synchronize and integrate information obtained from different modalities, disambiguate and recover from errors with the assistance of the multi-modal input information. Such a system would greatly improve user satisfaction, system performance and system robustness.

What is further desired is an HMI user input system that can synchronize and integrate the multi-modal information obtained from different modalities in any order.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

Embodiments of a dialog system that incorporates a multi-modal synchronization and disambiguation system for use in human-machine interaction (HMI) systems are described. Embodiments include a component that receives user inputs from a plurality of different user input mechanisms. The multi-modal synchronization and disambiguation system synchronizes and integrates the information obtained from different modalities, disambiguates the input, and recovers from any errors that might be produced with respect to any of the user inputs. Such a system effectively addresses any ambiguity associated with the user input and corrects for errors in the human-machine interaction.

In the following description, numerous specific details are introduced to provide a thorough understanding of, and enabling description for, embodiments of the multi-modal synchronization and disambiguation system and method. One skilled in the relevant art, however, will recognize that these embodiments can be practiced without one or more of the specific details, or with other components, systems, etc. In other instances, well-known structures or operations are not shown, or are not described in detail, to avoid obscuring aspects of the disclosed embodiments.

Figure 1:
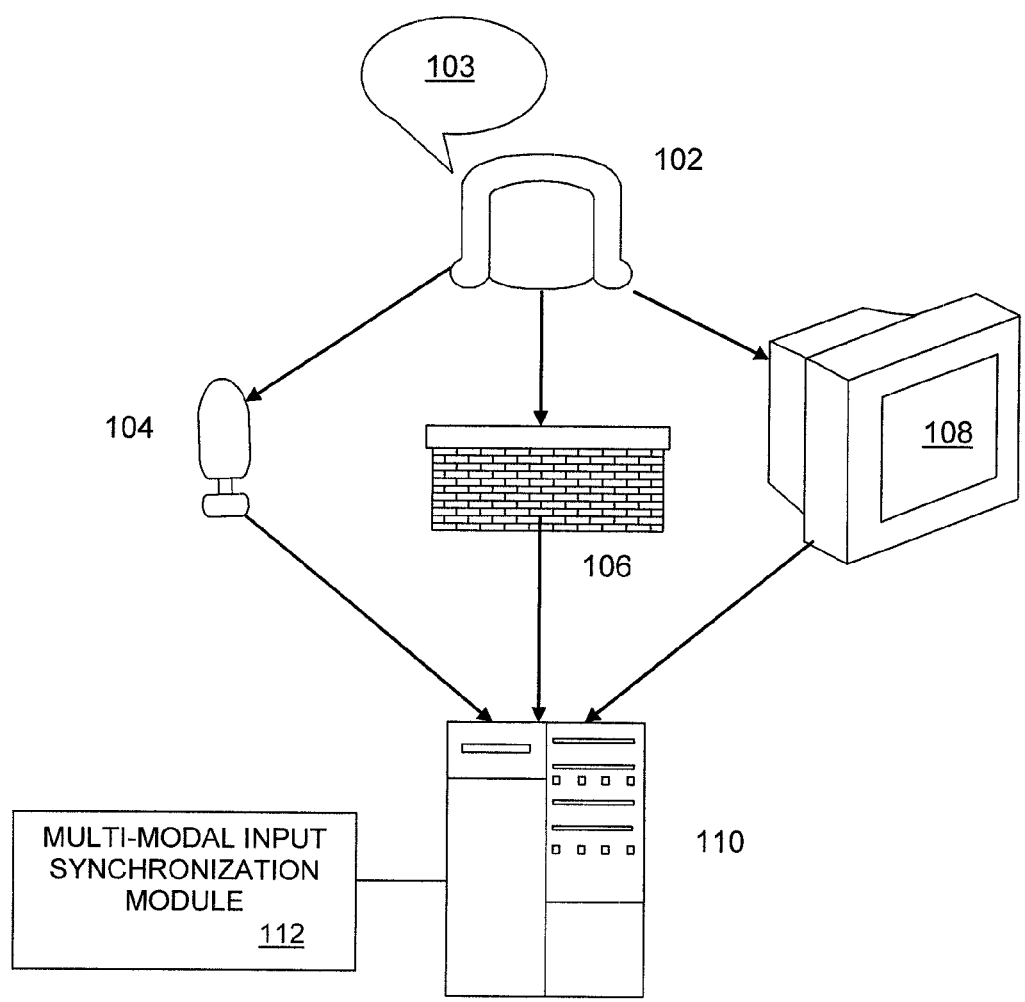
FIG. 1 illustrates a multi-modal human-machine system, that implements a multi-modal synchronization and disambiguation system, according to an embodiment.

FIG. 1 illustrates a multi-modal human-machine system, that implements a multi-modal synchronization and disambiguation system, according to an embodiment. In system 100, a user 102 interacts with a machine or system 110, which may be a computing system, machine, or any automated electromechanical system. The user can provide input to system 110 through a number of different modalities, typically through voice or touch controls through one or more input means. These include, for example, keyboard or mouse input 106, touch screen or tablet input 108, and/or voice input 103 through microphone 104. Other means of user input are also possible, such as foot controls, keypads, joystick/servo controls, game-pad input, infrared or laser pointers, camera-based gesture input, electromagnetic sensors, and the like. Different user inputs may control different aspects of the machine operation. In certain instances, a specific modality of input may control a specific type of operation. For example, voice commands may be configured to interface with system administration tasks, and keyboard input may be used to perform operational tasks. In one embodiment, the user input from the different input modalities are used to control at least certain overlapping functions of the machine 110. For this embodiment, a multi-modal input synchronization module 112 is used to synchronize and integrate the information obtained from different input modalities 104-108, disambiguate the input, and use input from any modality to correct, modify, or otherwise inform the input from any other modality.

As shown in FIG. 1, in many human-machine interaction (HMI) systems, users can interact with system via multiple input devices, such as touch screen, mouse, keyboard, microphone, and so on. The multi-modal input mechanism provides user flexibility to input information to the system more efficiently any through their preferred method. For example, when using a navigation system, a user may want to find a restaurant in the area. He or she may prefer specifying the region through a touch screen interface directly on a displayed map, rather than by describing it through speech or voice commands. In another example, when a user adds a name of contact into his address book, it may be more efficient and convenient to say the name directly than by typing it through a keyboard or telephone keypad.

Users may also use multiple modalities to achieve their tasks. That is, the machine or an aspect of machine operation may accept two or more modalities of user input. In some cases, a user may utilize all of the possible modalities of input to perform a task. The multi-modal synchronization component 112 allows for the synchronization and integration of the information obtained from different modalities. The different inputs can be used to disambiguate the responses and provide error recovery for any problematic input. In this manner, users can utilize input methods that are most desired, and are not always forced to learn different input conventions, such as new gestures or commands that have unique meanings.

Unlike traditional multi-modal HMI systems that only allow the user to use one of multiple modalities at one time, the multi-modal synchronization component allows the user to input information via multiple modalities at the same time. For example, the user can speak to the system while drawing something on the touch screen. Thus, in a navigation system, the user can utter "find a restaurant in this area" while drawing a circular area on a map display on a touch screen. In this case, the user is specifying what is meant by "this area" through the touch screen input. The determination of the meaning of a user's multi-modal input would depend on the information conveyed in different modalities, the confidence of the modalities at that time, as well as the time of the information received from the different modalities.

Figure 2:
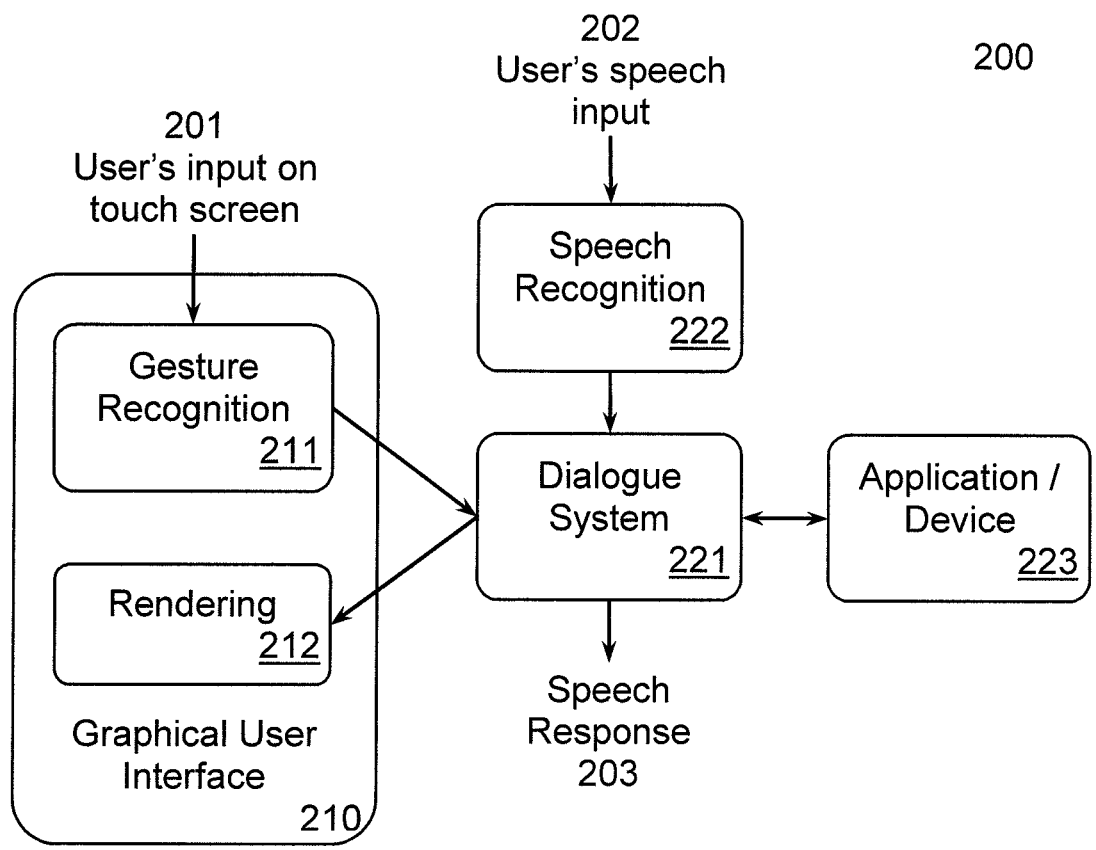
FIG. 2 is a block diagram of a multi-modal user interaction system that accepts a user's gesture and speech as inputs, and that includes a multi-modal synchronization and disambiguation system, according to an embodiment.

FIG. 2 is a block diagram of a multi-modal user interaction system that accepts user's gesture and speech as input. In a multi-modal user interaction system 200, a user can input information by typing, touching a screen, saying a sentence, or other similar means. Physical gesture input, such as touch screen input 201 is sent to a gesture recognition module 211. The gesture recognition module will process the user's input and classify it into different types of gestures, such as a dragging action, or drawing a point, line, curve, region, and so on. The user's speech input 202 will be sent to a speech recognition module 222. The recognized gesture and speech from the corresponding gesture recognition module and the speech recognition module will be sent to the dialog system 221. The dialog system synchronizes and disambiguates the information obtained from each modality based on the dialog context and the temporal order of the input events. The dialog system interacts with the application or device 223 to finish the task the user specified via multi-modal inputs. The output of the interaction and the results of the executed task are then conveyed to the user through a speech response 203 and/or are displayed through a rendering module 212 on a graphical user interface (GUI) 210. The system 200 of FIG. 2 may be used to perform the input tasks provided in the example above of a user specifying a restaurant to find based on a combination of speech and touch screen input.

A primary function of the multi-modal user interaction system is to distinguish and synchronize user input that may be directed to the same application. Different input modalities may be directed to different tasks, even if they are input at the same time. Similarly, inputs provided by the user at different times through different modalities may actually be directed to the same task. In general, applications and systems only recognize user input that is provided through a proper modality and in the proper time period.

Figure 3:
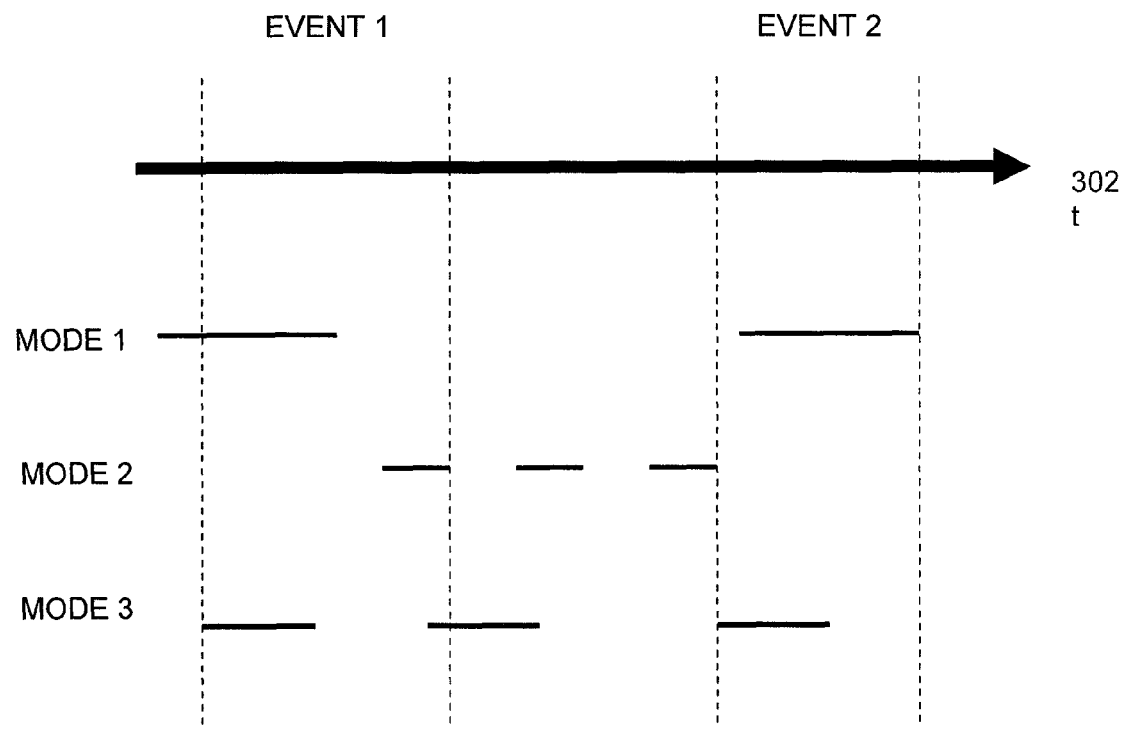
FIG. 3 illustrates the processing of input events using a multi-modal user interaction system, under an embodiment.

FIG. 3 illustrates the processing of input events using a multi-modal user interaction system, under an embodiment. As shown in FIG. 3, the horizontal axis 302 represents input events for a system along a time axis. Two example events are illustrated as denoted "event 1" and "event 2". The input events represent valid user input periods for a specific application or task. Three different input modalities denoted modalities 1, 2, and 3, are shown, and can represent a drawing input, a spoken input, a keyboard input, and so on. The different input modalities have user inputs that are valid at different periods of time and for varying durations. For event 1, the user has provided inputs through modalities 1, 2, and 3, but modality 2 is a relatively short and late input. Similarly for event 2, modalities 1 and 3 appear to have valid input, but modality 2 may be early or nonexistent. The multi-modal interaction system may use information provided by any of the modalities to determine whether a particular input is valid, as well as help discern the proper meaning of the input.

The system can also ask for more input from various modalities when the received information is not enough in determining the meaning. The synchronization and integration of multi-modal information can be directed by predefined rules or statistical models developed for different applications and tasks.

The example provided above illustrates the fact that information obtained from a single channel (e.g., voice command) often contains ambiguities. Such ambiguities could occur due to unintended multiple interpretations of the expression by the user. For example, the phrase "this area" by itself is vague unless the user provides a name that is recognized by the system. In another example, a gesture on touch screen may have different meanings. For example, moving a finger along a straight line on a touch screen that shows a map can mean drawing a line on the map or dragging the map in a particular direction. The multi-modal synchronization module makes use of the information from all the utilized modalities to provide the most likely interpretation of the user input. When an ambiguity is detected in the information obtained from a particular channel, different ways can be used at different system states. The system may use prior context to help the disambiguation, or it may ask the user for clarification from the same or different modalities. Continuing with the previous example, assume speech and touch screen are the two input modalities and user moves his or her finger on a map displayed on the touch screen. There are at least two possible interpretations of this gesture: draw a line on the map, or drag the map towards another direction. In this case, if the user says "I want to find some restaurants on this street", the system would know the user draws the line to specify a street. If the user does not say anything around that time, it is likely that the user just wants to drag the map.

The information obtained from one modality may also contain errors. These errors may come from devices, systems and even users. Furthermore, the error from one modality may also introduce inconsistency with the information from other modalities. The multi-modal synchronization and disambiguation component can resolve the inconsistency, select the correct interpretation, and recover from such errors based on the context and confidence. In one embodiment, the confidence score is calculated by including factors, such as the performance specification of the input device, the importance of a particular modality, the performance of the algorithms used to obtain information from input data, etc. When there are inconsistencies among different modalities, multiple hypotheses together with corresponding confidence scores from each modality are used to decide which ones are the likely ones to be passed to the next stage processing. The aggregated confidence score for each hypothesis is computed through a weighted linear combination of the confidence scores from different available modalities for that hypothesis or through other combination functions.

Figure 4:
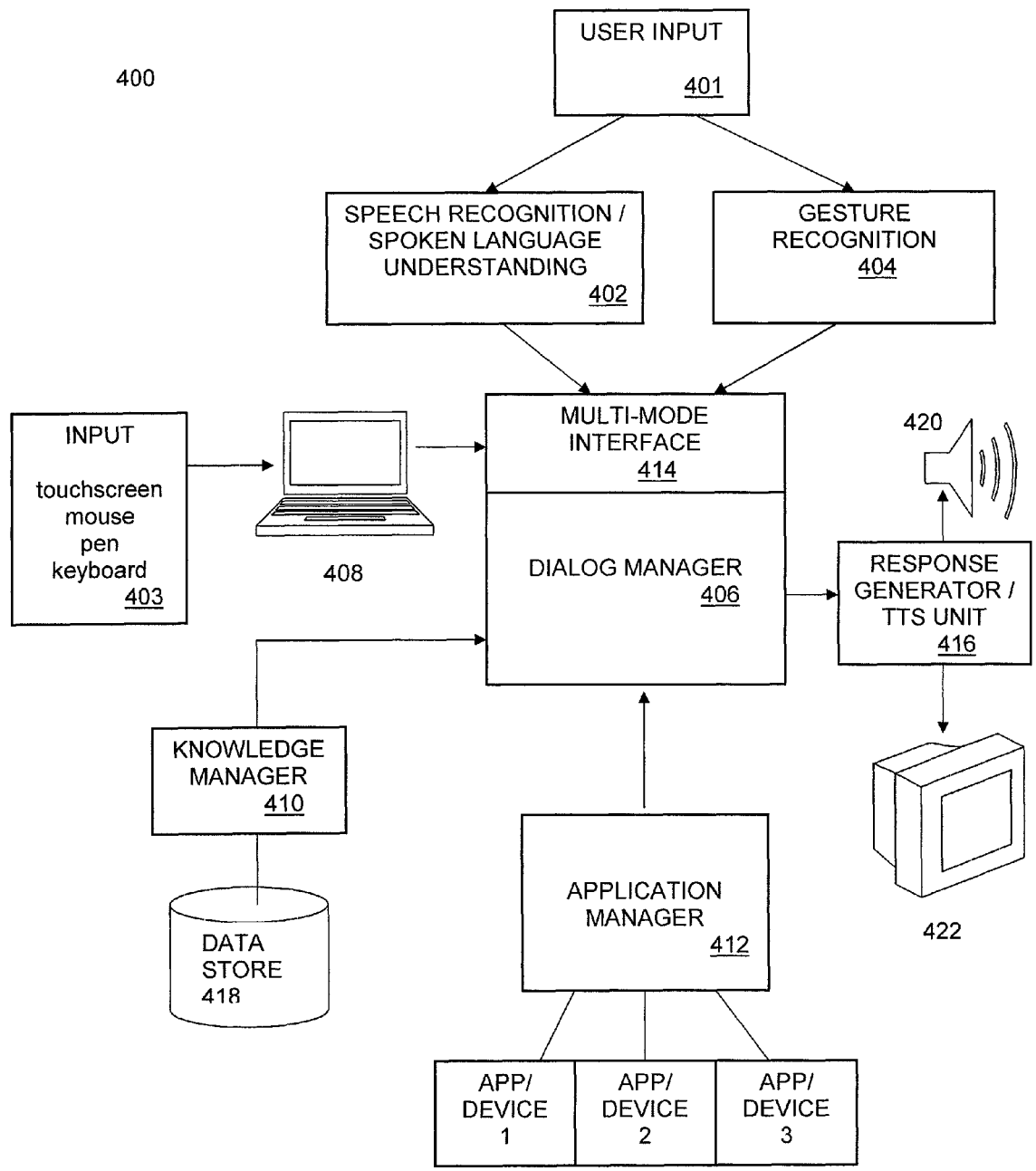
FIG. 4 is a block diagram of a spoken dialog manager system that implements a multi-modal interaction system, under an embodiment.

FIG. 4 is a block diagram of a spoken dialog system that implements a multi-modal interaction system, under an embodiment. For purposes of the present description, any of the processes executed on a processing device may also be referred to as modules or components, and may be standalone programs executed locally on a respective device computer, or they can be portions of a distributed client application run on one or more devices. The core components of system 400 include a spoken language understanding (SLU) module and speech recognition (SR) module 402 with multiple understanding strategies for imperfect input, an information-state-update or other kind of dialog manager (DM) 406 that handles multiple dialog threads, a knowledge manager (KM) 410 that controls access to ontology-based domain knowledge, and a data store 418. In one embodiment, user input 401 comprising spoken words and phrases produces acoustic waves that are received by the speech recognition unit 402. The speech recognition unit 402 can include components to provide functions, such as dynamic grammars and class-based n-grams. The recognized utterance output by speech recognition unit will be processed by spoken language understanding unit to get the semantic meaning of user's voice-based input. In the case where the user input 401 is text-based rather than voice-based, the speech recognition is bypassed and spoken language understanding unit will receive user's text-based input and generate the semantic meaning of user's text-based input. The user input 401 can also include gestures or other physical communication means. In this case, a gesture recognition component 404 converts the recognized gestures into machine recognizable input signals. The gesture input and recognition system could be based on camera-based gesture input, laser sensors, infrared or any other mechanical or electromagnetic sensor based system. The user input can also be provided by a computer or other processor based system 408. The input through the computer 408 can be through any method, such as keyboard/mouse input, touch screen, pen/stylus input, or any other available input means.

For the embodiment of system 400, the user inputs from any of the available methods (voice, gesture, computer, etc.) are provided to a multi-modal interface module 414 that is functionally coupled to the dialog manager 404. The multi-modal interface includes one or more functional modules that perform the task of input synchronization and input disambiguation. The input synchronization function determines which input or inputs correspond to a response for a particular event, as shown in FIG. 3. The input disambiguation function resolves any ambiguity present in one or more of the inputs.

The proper input is then processed by the dialog manager component 404. A response generator and text-to-speech (TTS) unit 416 provides the output of the system 400 and can generate audio, text and/or visual output based on the user input. Audio output, typically provided in the form of speech from the TTS unit, is played through speaker 420. Text and visual/graphic output can be displayed through a display device 422, which may execute a graphical user interface process, such as GUI 210 shown in FIG. 2. The graphical user input may also access or execute certain display programs that facilitate the display of specific information, such as maps to show places of interest, and so on.

The output provided by response generator 416 can be an answer to a query, a request for clarification or further information, reiteration of the user input, or any other appropriate response (e.g., in the form of audio output). The output can also be a line, area or other kind of markups on a map screen (e.g., in the form of graphical output). In one embodiment, the response generator utilizes domain information when generating responses. Thus, different wordings of saying the same thing to the user will often yield very different results. System 400 illustrated in FIG. 4 includes a large data store 418 that stores certain data used by one or more modules of system 400.

System 400 also includes an application manager 412 that provides input to the dialog manager 404 from one or more applications or devices. The application manager interface to the dialog manager can be direct, as shown, or one or more of the application/device inputs may be processed through the multi-modal interface 414 for synchronization and disambiguation along with the user inputs 401 and 403.

The multi-modal interface 414 may comprise one or more distributed processes within the components of system 400. For example, the synchronization function may be provided in dialog manager 404 and disambiguation processes may be provided in a SR/SLU unit 402 and gesture recognition module 404, and even the application manager 412. The synchronization function synchronizes the input based on the temporal order of the input events as well as the content from the recognizers, such as speech recognizer, gesture recognizer. For example, a recognized speech "find a Chinese restaurant in this area" would prompt the system to wait an input from the gesture recognition component or search for the input in an extended proceeding period. A similar process can be expected for the speech recognizer if a gesture is recognized. In both cases, speech and gesture buffers are needed to store the speech and gesture events for an extended period. The disambiguation function disambiguates the information obtained from each modality based on the dialog context.

Figure 5:
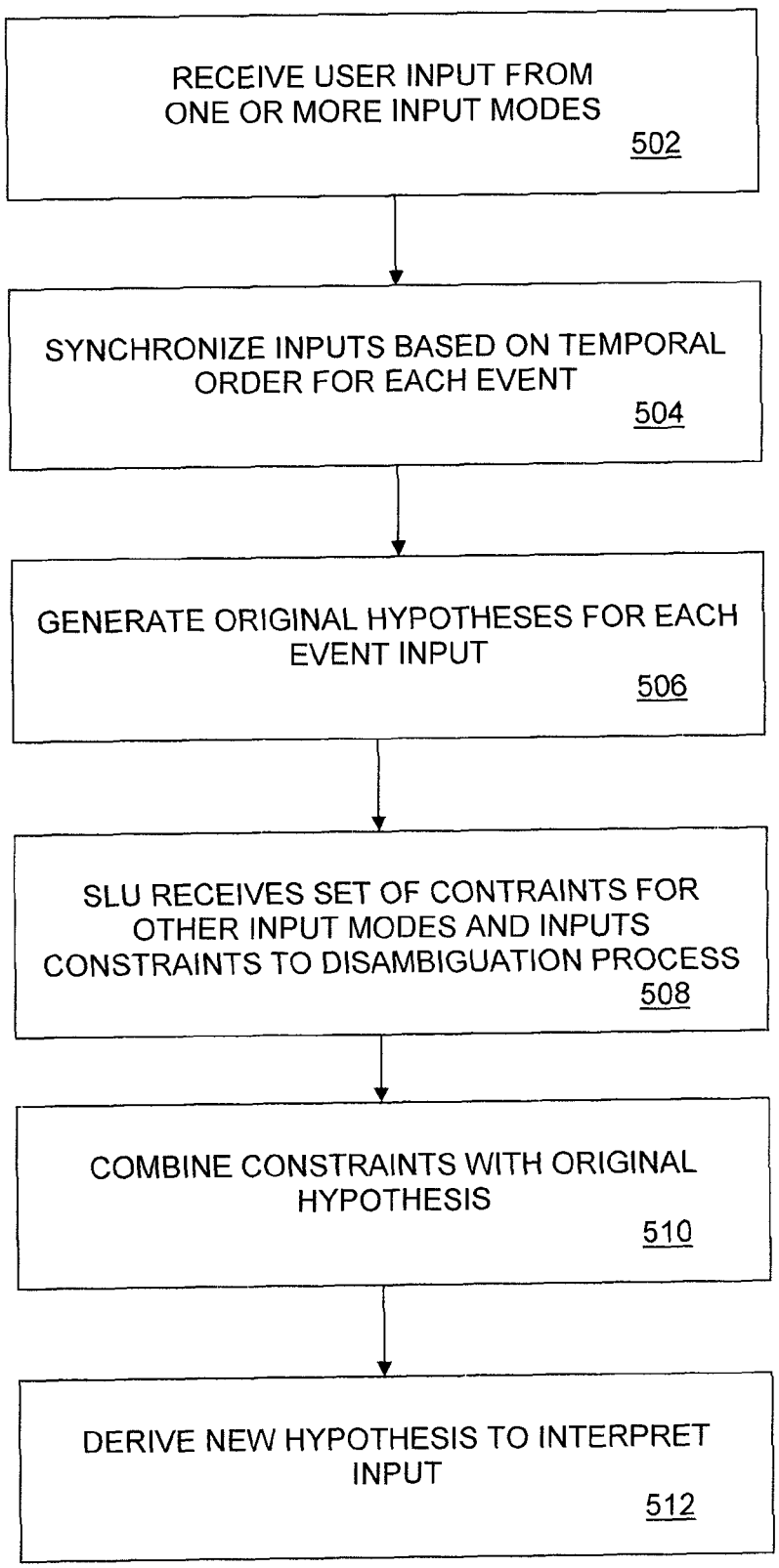
FIG. 5 is a flowchart that illustrates a method of processing user inputs in a dialog system through a multi-modal interface, under an embodiment.

FIG. 5 is a flowchart that illustrates a method of processing user inputs in a dialog system through a multi-modal interface, under an embodiment. Upon receiving an input from the one or more modalities, block 502, the synchronization functions synchronizes the input based on the temporal correspondence of the events to which the inputs may correspond, block 504. For each input, the dialog manager derives an original set of hypothesis regarding the probability of what the input means, block 506. The uncertainty in the hypothesis (H) represents an amount of ambiguity in the input. The probability of correctness for a certain hypotheses may be expressed as a weighted value (W). Thus, each input may have associated with it a hypothesis and weight (H, W). For multiple input modalities, a hypothesis matrix is generated, such as $(H_1\ W_1;\ H_2\ W_2;\ H_3\ W_3)$ for three input modalities (e.g., speech/gesture/keyboard).

In certain cases, input from a different input type or modality can help clarify the input from another modality. For example, a random gesture to a map may not clearly indicate where the user is pointing to, but if he or she also says "Palo Alto," then this spoken input can help remedy ambiguity in the gesture input, and vice-versa. This step is performed by the disambiguation process that may be associated with the input recognition units. As shown in FIG. 5, in block 508, the spoken language unit receives a set of constraints from the dialog manager's interpretation of the other modal input, and provides these constraints to the disambiguation process. The constraints are then combined with the original hypothesis within the dialog manager, block 510. The dialog manager then derives new hypotheses based on the constraints that are based on the other inputs, block 512. In this manner, input from one or more other modalities is used to help determine the meaning of input from a particular input modality.

The multi-modal interface system thus provides a system and method for synchronizing and integrating multi-modal information obtained from multiple input devices, and disambiguating the input based on multi-modal information. This system and method enables a dialog system to detect and recover from errors based on multi-modal information. The system provides more flexibility and convenience to user by allowing user to input information via multiple modalities at the same time. The disambiguation and error recovery mechanisms can improve the performance and robustness of HMI systems. Embodiments of the multi-modal interface system may be used in any type of human-machine interaction (HMI) system, such as dialog systems for operating in-car devices and services; call centers, smart phones or other mobile devices. Such systems may be speech-based systems that include one or more speech recognizer components for spoken input from one or more users, or they may be gesture input, machine entry, or software application input means, or any combination thereof.

Aspects of the multi-modal synchronization and disambiguation process described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: microcontrollers with memory (such as EEPROM), embedded microprocessors, firmware, software, etc. Furthermore, aspects of the content serving method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the multi-modal input interface is not intended to be exhaustive or to limit the embodiments to the precise form or instructions disclosed. While specific embodiments of, and examples for, processes in computing devices are described herein for illustrative purposes, various equivalent modifications are possible within the scope of the disclosed methods and structures, as those skilled in the relevant art will recognize. The elements and acts of the various embodiments described above can be combined to provide further embodiments. These and other changes can be made to the multi-modal input interface process in light of the above detailed description.

In general, in the following claims, the terms used should not be construed to limit the disclosed method to the specific embodiments disclosed in the specification and the claims, but should be construed to include all operations or processes that operate under the claims. Accordingly, the disclosed structures and methods are not limited by the disclosure, but instead the scope of the recited method is to be determined entirely by the claims.

While certain aspects of the disclosed system and method are presented below in certain claim forms, the inventors contemplate the various aspects of the methodology in any number of claim forms. For example, while only one aspect may be recited as embodied in machine-readable medium, other aspects may likewise be embodied in machine-readable medium. Accordingly, the inventors reserve the right to add additional claims after filing the application to pursue such additional claim forms for other aspects.

What is claimed is:

1. A computer-implemented method in a dialog system, comprising:

receiving inputs from a plurality of input modalities within an input period, wherein the plurality of input modalities provides inputs regarding a plurality of dialog tasks, wherein each dialog task of the plurality of dialog tasks is associated with a specific duration within the input period, and wherein input from each of the plurality of modalities is valid input for a first dialog task when the input occurred within the specific duration associated with the first dialog task, the valid inputs from each modality for the first dialog task determined further by:
ignoring inputs that are shorter than a determined minimum duration, and
ignoring inputs that are associated with a dialog task of the plurality of dialog tasks different from the first task, and wherein the valid inputs for the first dialog task each have a discernable meaning;

generating an initial hypothesis regarding an overall meaning of the valid inputs for the first dialog task based on the discernable meaning of one of the valid inputs for the first dialog task;
determining if there is an error associated with the initial hypothesis using a confidence measure;
receiving one or more constraints for the initial hypothesis based on one or more other valid inputs for the first dialog task if the initial hypothesis has an error, wherein the constraints are based on the discernable meanings provided by the one or more other valid inputs;
combining the one or more constraints with the initial hypothesis;
deriving a new hypothesis regarding an overall meaning of the valid inputs for the first dialog task; and
using the new hypothesis to interpret the valid inputs regarding the first dialog task, wherein the dialog system provides the interpretation to a response generator within the dialog system to generate a system output to complete the first dialog task.

2. The method of claim 1 wherein the inputs are provided at least in part by a human user, and wherein the plurality of input modalities are selected from the group consisting of: spoken input, gesture input, keyboard input, mouse input, and pen or stylus input.

3. The method of claim 2 wherein the inputs are provided at least in part by a user utterance input during a first time period, and a user gesture input during a second time period, wherein the gesture input provides at least some information missing from the user utterance.

4. The method of claim 1 wherein the inputs contain one or more errors, and wherein the new hypothesis is used to disambiguate the input based on multi-modal information provided by the constraints.

5. The method of claim 3 further comprising:
providing a speech buffer for the user utterance input and a gesture buffer for the gesture input; and
using the speech and gesture buffers to extend the first time period and second time period for recognition of the valid input for the task.

6. The method of claim 5 wherein the dialog system further comprises a gesture recognition unit to interpret physical user input provided through a touch screen interface or sensed by one or more gesture sensors.

7. A dialog system, comprising one or more processors and a plurality of input modalities, the one or more processors being programmed with instructions for:
receiving inputs from a plurality of input modalities within an input period, wherein the plurality of input modalities provides inputs regarding a plurality of dialog tasks, wherein each dialog task of the plurality of dialog tasks is associated with a specific duration within the input period, and wherein input from each of the plurality of modalities is valid input for a first dialog task when the input occurred within the specific duration associated with the first dialog task, the valid inputs from each modality for the first dialog task determined further by:
ignoring inputs that are shorter than a determined minimum duration, and
ignoring inputs that is are associated with a dialog task of the plurality of dialog tasks different from the first task, and
wherein the valid inputs for the first dialog task each have a discernable meaning;
generating an initial hypothesis regarding an overall meaning of the valid inputs for the first dialog task based on the discernable meaning of one of the valid inputs for the first dialog task and determining if there is an error associated with the initial hypothesis using a confidence measure;
disambiguating by receiving one or more constraints for the initial hypothesis based on one or more other valid inputs for the first dialog task if the initial hypothesis has an error, wherein the constraints are based on the discernable meanings provided by the one or more other valid inputs, and by combining the one or more constraints with the initial hypothesis and deriving a new hypothesis regarding an overall meaning of the valid inputs for the first dialog task; and
using the new hypothesis to interpret the valid inputs regarding the first dialog task, wherein the dialog system provides the interpretation to a response generator within the dialog system to generate a system output to complete the first dialog task.

8. The system of claim 7 wherein the inputs are provided at least in part by a human user, and wherein the plurality of input modalities are selected from the group consisting of: spoken input, gesture input, keyboard input, mouse input, and pen or stylus input.

9. The system of claim 8 wherein the inputs are provided at least in part by a user utterance input during a first time period, and a user gesture input during a second time period, wherein the gesture input provides at least some information missing from the user utterance.

10. The system of claim 7 wherein the inputs contain one or more errors, and wherein the new hypothesis is used to disambiguate the input based on multi-modal information provided by the constraints.

11. The system of claim 9 further comprising:
a speech buffer for the user utterance input; and
a gesture buffer for the gesture input, wherein the speech and gesture buffers are used to extend the first time period and second time period for recognition of the valid input for the task.

12. The system of claim 11 wherein the dialog system further comprises gesture recognition instructions to interpret physical user input provided through a touch screen interface or sensed by one or more gesture sensors.

13. The system of claim 12 wherein elements of the instructions for disambiguating are provided with speech recognition instructions and with the gesture recognition instructions.

14. The system of claim 13 further comprising:
a response generator generating a system output based on the user input;
a text-to-speech unit converting at least a portion of the system output to spoken language output;
an audio output device coupled to a text-to-speech unit playing the spoken language output for the user; and
a graphical output displaying graphical output from the response generator through a graphical user interface process.

15. A non-transitory computer readable storage medium containing a plurality of program instructions, which when executed by a processor, cause the processor to perform the steps of:
receiving inputs from a plurality of input modalities within an input period, wherein the plurality of input modalities provides inputs regarding a plurality of dialog tasks, wherein each dialog task of the plurality of dialog tasks is associated with a specific duration within the input period, and wherein input from each of the plurality of modalities is valid input for a first dialog task when the input occurred within the specific duration associated with the first dialog task, the valid inputs from each modality for the first dialog task determined further by:
  ignoring inputs that are shorter than a determined minimum duration, and
  ignoring inputs that are associated with a dialog task of the plurality of dialog tasks different from the first task, and
wherein the valid inputs for the first dialog task each have a discernable meaning;
generating an initial hypothesis regarding an overall meaning of the valid inputs for the first dialog task based on the discernable meaning of one of the valid inputs for the first dialog task;
determining if there is an error associated with the initial hypothesis using a confidence measure;
receiving one or more constraints for the initial hypothesis based on one or more other valid inputs for the first dialog task if the initial hypothesis has an error, wherein the constraints are based on the discernable meanings provided by the one or more other valid inputs;
combining the one or more constraints with the initial hypothesis;
deriving a new hypothesis regarding an overall meaning of the valid inputs for the first dialog task; and
using the new hypothesis to interpret the valid inputs regarding the first dialog task, wherein the dialog system provides the interpretation to a response generator within the dialog system to generate a system output to complete the first dialog task.

16. The storage medium of claim 15 wherein the inputs are provided at least in part by
  a human user, and wherein the plurality of input modalities are selected from the group consisting of: spoken input, gesture input, keyboard input, mouse input, and pen or stylus input; and
  an application program or a device, and wherein the plurality of input modalities further include programmatic input and device input.

17. The storage medium of claim 16 wherein the inputs contain one or more errors, and wherein the new hypothesis is used to disambiguate the input based on multi-modal information provided by the constraints.

\* \* \* \* \*